United States Patent [19]

Johnson et al.

[11] Patent Number: 5,749,944
[45] Date of Patent: May 12, 1998

[54] PROCESS AND APPARATUS FOR THE REMOVAL OF DIMETHYL ESTER VAPORS OR PARTICLES EMITTED DURING THE STORAGE OF DIMETHYL ESTERS

[75] Inventors: Elliott Will Henry Johnson; Robert Wellington Stepp, III; William L. Cook, all of Kingsport, Tenn.

[73] Assignee: Eastman Chemical Company, Kingsport, Tenn.

[21] Appl. No.: 814,372

[22] Filed: Mar. 11, 1997

[51] Int. Cl.[6] .................................................. B01D 47/06
[52] U.S. Cl. ............................ 95/150; 95/237; 96/271; 96/322; 96/372
[58] Field of Search ..................... 55/261, 246, 222, 55/223, 220; 95/149, 150, 157, 224, 237, 238, 239, 246

[56] References Cited

U.S. PATENT DOCUMENTS

| | | | |
|---|---|---|---|
| 3,719,720 | 3/1973 | Bir et al. | 95/239 |
| 3,745,747 | 7/1973 | Psyras et al. | 95/239 |
| 3,755,990 | 9/1973 | Hardison | 55/240 |
| 3,778,968 | 12/1973 | Parker, Sr. | 95/237 |
| 3,778,969 | 12/1973 | Sudduth | 95/237 |
| 3,823,531 | 7/1974 | Crawley | 55/261 |
| 3,841,060 | 10/1974 | Hoad | 55/220 |
| 4,043,769 | 8/1977 | Nishino et al. | 95/237 |
| 4,265,944 | 5/1981 | Garner | 55/223 |
| 5,088,913 | 2/1992 | Chambers | 95/224 |
| 5,147,418 | 9/1992 | Laverman et al. | 55/220 |
| 5,219,585 | 6/1993 | Shealy et al. | 95/149 |
| 5,409,513 | 4/1995 | Teague et al. | 55/223 |
| 5,521,264 | 5/1996 | Mehra et al. | 95/238 |
| 5,533,437 | 7/1996 | Howard et al. | 95/240 |

FOREIGN PATENT DOCUMENTS

| | | | |
|---|---|---|---|
| 51-8202 | 1/1976 | Japan | 95/237 |
| 53-19185 | 2/1978 | Japan | 95/237 |
| 58-41090 | 9/1983 | Japan | 95/239 |
| 60-6636 | 1/1985 | Japan | 95/237 |
| 61-97017 | 5/1986 | Japan | 95/237 |

*Primary Examiner*—Duane S. Smith
*Attorney, Agent, or Firm*—Cheryl J. Tubach; Harry J. Gwinnell

[57] ABSTRACT

In a method for removing dimethyl ester vapors or particles emitted from a molten dimethyl ester storage tank, a gaseous mixture containing dimethyl ester vapors or particles and an inert gas are supplied to an inlet port of a water scrubber. Water is continuously sprayed through downstream spray nozzles located inside the water scrubber whereby the water and air mix with the gaseous mixture to form a foamy mixture of dimethyl ester, air and water. Water through an upstream spray nozzle located inside the water scrubber is intermittently sprayed to wash an inner wall of an elongated body and the inlet port of the water scrubber to remove buildup of dimethyl ester particles. The foamy mixture is continuously removed from an outlet port. The water scrubber utilized in the method has an elongated body having an inner wall, a top with an orifice for receiving air, and a bottom with an outlet port. The inlet port is positioned on the body between the top and the bottom of the water scrubber. At least one upstream water spray nozzle is positioned between the inlet port and the top. At least two downstream spray nozzles are positioned between the inlet port and the outlet port. The spray nozzles operates with a downward flow of water.

12 Claims, 1 Drawing Sheet

PROCESS AND APPARATUS FOR THE REMOVAL OF DIMETHYL ESTER VAPORS OR PARTICLES EMITTED DURING THE STORAGE OF DIMETHYL ESTERS

TECHNICAL FIELD

This invention relates to processes for removing contaminants from gases. More particularly, this invention relates to processes for the removal of dimethyl ester vapors or particles in an inert gas, which has been purged from storage tanks containing molten dimethyl ester.

BACKGROUND OF THE INVENTION

Polyester materials are used in numerous application in a variety of forms including fibers, injection molded articles, blow molded bottles and containers, extruded sheeting and film, and vacuum formed articles. Key intermediates in the manufacture of polyester materials are dimethyl esters. Examples include dimethyl terephthalate (DMT), dimethyl isophthalate, dimethyl 1,4-cyclohexanedicarboxylate, dimethyl 2,6-naphthalenedicarboxylate.

Dimethyl esters typically require high purity for use in making many polyesters. Water and other contaminants are highly undesirable especially in stored dimethyl esters. For example in the presence of DMT, water could lead to hydrolysis of the DMT causing an undesirable increase in acidity of the DMT. In many polyesterification processes, high acidity DMT products deleteriously affect product quality.

In many commercial production operations, polymerization grade DMT and other dimethyl esters are maintained in molten form and fed as needed to batch or continuous reactor systems used to make polyesters. The storage tanks containing the dimethyl esters are typically pressurized and purged with nitrogen gas to prevent moisture contamination. Occasionally dimethyl ester vapors or particles are emitted into the nitrogen gas above the molten dimethyl esters. When the storage tanks are depleted of inventory and refilled with the molten dimethyl esters, the nitrogen gas containing dimethyl ester vapors and particles is displaced and must be processed to remove these contaminants prior to safely releasing the nitrogen gas into the atmosphere.

Scrubbers are typically used to decontaminate the nitrogen gas. Methanol or other organic solvents have been used in these scrubbers to remove the dimethyl ester vapors and particles. Because some of the methanol escapes into the atmosphere from such scrubbers, this method of operation is environmentally undesirable. Refrigeration of the methanol stream coming from the scrubber has been one process utilized to recover the methanol and dissolved dimethyl ester. However, such process is expensive and not all of the methanol can be recovered.

Thus, a need in the art exists for a scrubbing system which does not pollute the atmosphere and which is inexpensive to operate. It is to the provision of such that the present invention is primarily directed.

SUMMARY OF THE INVENTION

The present invention solves the above-described problems in the prior art by providing an improved scrubbing process for removing dimethyl ester vapors or particles from a gaseous mixture with no release of methanol into the atmosphere comprising the step of contacting a gaseous mixture containing dimethyl ester vapors or particles and an inert gas with air and water to form a foamy mixture thereby separating the dimethyl esters from the gaseous mixture.

In another preferred embodiment of the invention, the improved scrubbing process comprises the step of supplying a gaseous mixture containing dimethyl ester vapors or particles and an inert gas to an inlet port of a water scrubber. The water scrubber comprises an elongated body having an inner wall, a top with an orifice for receiving air, and a bottom with an outlet port. The inlet port is positioned on the body between the top and the bottom of the water scrubber. At least one upstream water spray nozzle is positioned between the inlet port and the top. At least two downstream spray nozzles are positioned between the inlet port and the outlet port. The spray nozzles operate with a downward flow of water. Water, which is continuously sprayed through the downstream spray nozzles, and air mix with the gaseous mixture to form a foamy mixture of dimethyl ester and water. Water, which is intermittently sprayed through the upstream spray nozzle, washes the inner wall and the inlet port to remove build up of dimethyl ester particles. The foamy mixture is continuously removed from the outlet port.

In another preferred embodiment of the invention a water scrubber for removing contaminants of dimethyl ester vapors or particles from a gas is disclosed.

DESCRIPTION OF THE INVENTION

Figure 1:
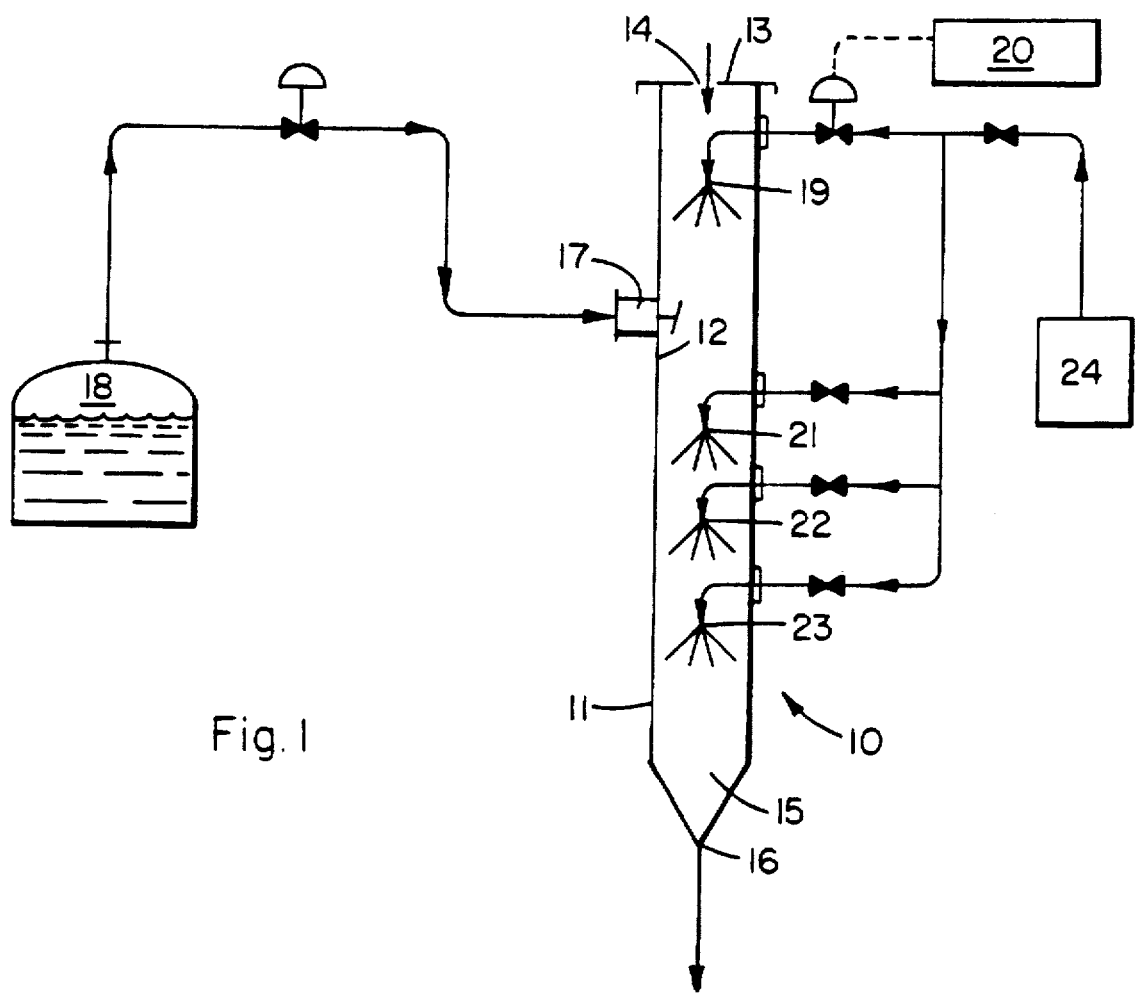
FIG. 1 is a process flow diagram illustrating a system embodying the principles of the method of the present invention.

While the present invention is susceptible to embodiment in various forms, there is shown in the accompanying FIG. 1 and hereinafter described in detail preferred embodiments of the invention. The present embodiments are to be considered as exemplifications of the invention without limitation to the specific embodiments illustrated and discussed.

Referring now in more detail to FIG. 1, a water scrubber 10 comprises an elongated cylindrical body 11 having an inner wall 12, a top 13 with an orifice 14 for receiving air, and a bottom 15 with an outlet port 16. An inlet port 17 for supplying a gaseous mixture containing dimethyl ester vapors or particles and an inert gas is located on the body 11. The gaseous mixture is supplied as an effluent from a molten dimethyl ester storage tank 18. An upstream water spray nozzle 19 is located above the inlet port 17 and is connected to a timer 20. Three downstream water spray nozzles 21–23 are located below the inlet port 17 and operate continuously. All of the spray nozzles are positioned such that the water flows downward toward the bottom 15 of the water scrubber 10. The spray nozzles all receive water from the same water supply source 24.

The preferred water scrubber 10 of the present invention will have at least one upstream spray nozzle 19 above the entry point of the gaseous mixture, i.e. the inlet port 17, and at least two, preferably three, downstream spray nozzles 21–23 below the entry point of the gaseous mixture. Additional spray nozzles may be employed for increased gas volumes.

The upstream spray nozzle 19 of the water scrubber 10 supplies water which washes the inner wall 12 and inlet port 17 to remove any buildup of dimethyl ester particles. The buildup may occur during operation of the water scrubber 10 due to dimethyl esters being insoluble in water. Only intermittent washing is needed since any buildup occurs over time. A timer 20 operates intermittently to supply water to the upstream spray nozzle 19. Alternatively, the water supply to the upstream spray nozzle may be turned on and off manually as part of regular operation regimes.

Water, the scrubbing agent, is sprayed continuously from the three downstream spray nozzles 21–23 to decontaminate the gaseous mixture that is received through the inlet port 17. The gaseous mixture may be that which is present above molten dimethyl ester in the storage tank 18. The gaseous mixture comprises contaminants of dimethyl ester vapors and/or particles in an inert gas, usually nitrogen.

The gaseous mixture is decontaminated by the water scrubber 10 such that the nitrogen gas may be released without harm to the environment. The downward flow of the water primarily supplied from the downstream spray nozzles 21–23 and air creates a foamy mixture of dimethyl ester, air and water in the bottom 15 of the water scrubber 10. The air is received from the orifice 14 at the top 13 due to the action of the downward flow of water. An air current is created forcing air to flow from the top 13 through the bottom 14 of the water scrubber 10. The foamy mixture is flushed out of the water scrubber 10 through the outlet port 16.

The foamy mixture may be further processed for disposal. Typically, a water treatment facility is utilized in which any solid material is removed and purified water is returned to an appropriate stream, lake or other environmentally suitable location.

Generally, water of any purity can be used as the scrubbing agent in the water scrubber 10 such as purified potable water, deionized water, spring water, well water and filtered river water. Filtered river water is preferred. The temperature of the water is not critical. Water temperatures in the range of about 50° F. (10° C.) to about 90° F. (32.2° C.) are suitable. Preferred temperatures are from about 50° F. to about 75° F. (23.9° C.).

In a preferred embodiment of the present invention the water scrubber has a diameter of about 6 to about 10 inches (0.1524 to 0.254 meters), more preferably 8 inches (0.2032 meters) and a height of about 4 to about 10 feet (1.22 to 3.05 meters), more preferably 6 feet (1.83 meters). The water scrubber is constructed of stainless steel, preferably schedule 10 S 304 stainless steel.

The rate of flow of water from the spray nozzles is about 5 gallons per minute (0.000315 m$^3$ per second) for each spray nozzle. However, the operable range is about 1 to 10 gallons per minute (0.000063 to 0.00063 m$^3$ per second) per spray nozzle. Of course, this rate of water usage may be adjusted for water scrubbers having different dimensions.

The present invention also provides for a method for removing dimethyl ester contaminants from the gaseous mixture that may be the effluent of the molten dimethyl ester storage tank 18. The gaseous mixture is supplied to the water scrubber 10 through the inlet port 12. The gaseous mixture flows from the storage tank 18 to the water scrubber 10 through a conventional pipe line. The orifice 14 at the top 13 of the water scrubber 10 receives air. As a result of the bottom spray nozzles being positioned downward, air is forced from the top 13 to the bottom 15 of the water scrubber. Water is continuously sprayed water through at least two, preferably three, downstream spray nozzles 21–23. Water is intermittently sprayed through at least one upstream spray nozzle 19. The foamy mixture of dimethyl ester, air and water formed in the bottom 15 is continuously removed from the outlet port 16 of the water scrubber for downstream processing.

The water scrubber 10 and the process described in the present invention are highly suitable for dimethyl esters used in polyester manufacturing such as dimethyl terephthalate, dimethyl isophthalate, dimethyl 1,4-cyclohexanedicarboxylate, dimethyl 2,6-naphthalenedicarboxylate and the like.

The water scrubber and the process for removing dimethyl ester vapors or particles emitted from molten dimethyl ester storage tanks of the present invention, which utilized water as the scrubbing agent, solve problems of the prior art by replacing methanol in conventional scrubbers. The use of water prevents the release of methanol vapors to the atmosphere and eliminates the costly refrigeration step to recover methanol and dissolved dimethyl ester.

The following examples will further illustrate the invention.

EXAMPLE 1

A pilot water scrubber having an 8 inch (0.2032 meter) diameter and 8 feet (2.44 meters) height was designed and installed in a dimethyl terephthalate (DMT) production facility. The water scrubber was constructed of 316 stainless steel and was open to the atmosphere in the top and bottom sections. A one-inch (0.0254 meter) plate was installed on top of the water scrubber to prevent an excess amount of air from entering the water scrubber. A simple tie-in was made with a 2-inch (0.0508 meter) jacket piping into an existing vent line of a DMT storage tank. The jacket piping was then connected to the water scrubber by an inlet line. A 2-inch (0.0508 meter) jacket control valve was installed in the inlet line leading to the water scrubber and connected thereto by an inlet port. The water scrubber had six spray nozzles, each oriented in the downward position. Three were located above the inlet port and three located below the inlet port. Filtered water was used as the scrubbing agent.

First, the filtered water supply valve was opened to provide water service to the six spray nozzles. The spray nozzles above the inlet port operated on an automatic timer in which water was supplied to these spray nozzles every 10 minutes for a duration of 1 minute. This action provided an adequate flush of the water scrubber to prevent DMT buildup on the inner walls. Next, the pressure control valve in the inlet line was set to the automatic mode with a set point of 4 inches water scrubber (67.79 N/M$^2$). This allowed DMT vapors from the storage tank to enter the pilot unit rather than exit through the storage tank vent line which is set at a pressure of 6 inches water scrubber (1,016.9 N/M$^2$). A foamy mixture of DMT, air and water was formed in the water scrubber at a spray-cone region in the bottom section. The foamy mixture flowed easily via the bottom of the water scrubber to the sewer system.

EXAMPLE 2

The arrangement as set forth in Example 1 was utilized except that the water scrubber contained one spray nozzle above the inlet port operated on a timer and three spray nozzles below the inlet port which had a continuous water supply was installed onto an existing DMT storage tank. The water scrubber was 8 inches (0.2032 meters) in diameter and 6 feet (1.83 meters) in height. Effective removal of DMT resulted.

We claim:

1. A method for removing dimethyl ester vapors or particles emitted from a molten dimethyl ester storage tank comprising the step of contacting a gaseous mixture containing dimethyl ester vapors or particles and an inert gas with air and water to form a foamy mixture of dimethyl ester, air and water thereby separating the dimethyl ester from the gaseous mixture.

2. A method for removing dimethyl ester vapors or particles emitted from a molten dimethyl ester storage tank comprising the steps of:

a) supplying a gaseous mixture containing dimethyl ester vapors or particles and an inert gas to an inlet port of a water scrubber; the water scrubber comprising an elongated body having an inner wall, a top with an orifice for receiving air, and a bottom with an outlet port; the inlet port positioned on the body between the top and the bottom of the water scrubber; at least one upstream water spray nozzle positioned between the inlet port and the top; at least two downstream spray nozzles positioned between the inlet port and the outlet port; and the spray nozzles operating with a downward flow of water;

b) continuously spraying water through the at least two downstream spray nozzles whereby the water and air mix with the gaseous mixture to form a foamy mixture of dimethyl ester, air and water;

c) intermittently spraying water through the at least one upstream spray nozzle whereby the water from the upstream spray nozzle washes the inner wall and the inlet port to remove build up of dimethyl ester particles; and d) continuously removing from the outlet port the foamy mixture.

3. The method of claim 2 wherein the water temperature is in the range of about 50° F. (10° C.) to about 90° F. (32.2° C.).

4. The method of claim 3 wherein the water temperature is in the range of about 50° F. (10° C.) to about 75° F. (23.9° C.).

5. A water scrubber for removing contaminants of dimethyl ester vapors or particles from a gaseous mixture of a molten dimethyl ester storage tank comprising:

an elongated vertical body having an inner wall, a top with an orifice for receiving air and a bottom with an outlet port for removing a foamy mixture of dimethyl ester, air and water; an inlet port positioned along the body for receiving a gaseous mixture comprising an inert gas and contaminants of dimethyl ester vapors and particles; at least one upstream water spray nozzle positioned between the inlet port and the top; at least two downstream spray nozzles positioned between the inlet port and the outlet port; the spray nozzles operating with a downward flow of water; the at least one upstream water spray nozzle supplying water intermittently and the at least two downstream water spray nozzles supplying water continuously;

whereby the contaminants are separated from the inert gas by mixing with the air and water forming the foamy mixture and the upstream water spray nozzle removes dimethyl ester build-up at the inlet port and along the inner wall of the elongated body.

6. The water scrubber of claim 5 wherein the elongated vertical body is cylindrical.

7. The water scrubber of claim 5 wherein the dimethyl ester is selected from the group consisting of dimethyl terephthalate, dimethyl isophthalate, dimethyl 1,4-cyclohexanedicarboxylate and dimethyl 2,6-naphthalenedicarboxylate.

8. The water scrubber of claim 7 wherein the dimethyl ester is dimethyl terephthalate.

9. The water scrubber of claim 5 wherein the inert gas is nitrogen.

10. A water scrubber for removing dimethyl ester vapors or particles in a gaseous mixture of a molten dimethyl ester storage tank comprising an elongated cylindrical body having an inner wall, a top with an orifice for receiving air and a bottom with an outlet port for removing a foamy mixture of dimethyl ester, air and water; an inlet port positioned along the body for receiving a gaseous mixture containing nitrogen gas and contaminants of dimethyl ester vapors or particles; at least one upstream water spray nozzle positioned between the inlet port and the top; at least two downstream spray nozzles positioned between the inlet port and the outlet port; the spray nozzles operating with a downward flow of water; the upstream water spray nozzle supplying water intermittently and the downstream water spray nozzles supplying water continuously.

11. The water scrubber of claim 10 wherein the cylindrical body has a diameter of about 6 to about 10 inches (0.1524 to 0.254 meters) and a height of about 4 to about 10 feet (1.22 to 3.05 meters); is constructed of stainless steel; has a flow rate of water from the spray nozzles of about 1 to 10 gallons per minute (0.000063 to 0.00063 $m^3$ per second) for each spray nozzle.

12. The water scrubber of claim 11 wherein the cylindrical body has a diameter of about 8 inches (0.2032 meters) and a height of about 6 feet (1.83 meters); is constructed of schedule 10 S 304 stainless steel; and the flow rate of water from the spray nozzles is about 5 gallons per minute (0.000315 $m^3$ per second).

* * * * *